United States Patent [19]

Osawa

[11] Patent Number: 5,305,428
[45] Date of Patent: Apr. 19, 1994

[54] IMAGE FORMING APPARATUS

[75] Inventor: Kimio Osawa, Yokohama, Japan

[73] Assignee: Kabushiki Kaisha Toshiba, Kawasaki, Japan

[21] Appl. No.: 32,684

[22] Filed: Mar. 17, 1993

[30] Foreign Application Priority Data

Mar. 26, 1992 [JP] Japan .................................. 4-068664

[51] Int. Cl.⁵ .............................................. G06K 15/00
[52] U.S. Cl. ..................................... 395/110; 395/115
[58] Field of Search .............. 395/117, 113, 112, 115, 395/116, 150, 151, 165; 400/68, 69, 70, 76; 355/203, 204, 205, 206

[56] References Cited

U.S. PATENT DOCUMENTS

| 4,763,281 | 8/1988 | Arakawa | 364/523 |
| 4,926,347 | 5/1990 | Uchida et al. | 395/113 |
| 5,083,286 | 1/1992 | Hino et al. | 395/115 |

OTHER PUBLICATIONS

PCL5 Printer Language Technical Reference Manual, "Font Selection," pp. 8-1 to 8-3, Hewelett Packard, Sep. 1990.

Primary Examiner—Arthur G. Evans
Attorney, Agent, or Firm—Limbach & Limbach

[57] ABSTRACT

In a case that IC cards in which font data is stored are not mounted on an image forming apparatus, a font name of font data stored in a ROM provided in the apparatus is displayed on a control panel. In a case that the IC cards are mounted on the image forming apparatus, a CPU provided in the apparatus monitors the mount and detects the mounts, and a font name of font data stored in the mounted IC cards are displayed on the operation panel prior to the other font name. In other words, the image forming apparatus of this invention can select and display the font name of font data stored in the outer storing apparatus prior to the other font when the outer storing apparatus in which font data is stored is mounted on the image forming apparatus.

6 Claims, 5 Drawing Sheets ized, scanned, and irradiated on an electric conductive member, that is, a photosensitive member, so that image data is developed after an electrostatic developing process, and image is transferred to a transferring material, for example, paper. That is, according to this type of image forming apparatus, image data supplied from the outer unit, that is, image data is expanded to bit map data, and the laser beam is modulated by bit map data. An electrostatic distribution pattern, that is, an electrostatic latent image, is formed on the photosensitive member where the modulated laser beam is scanned. Developer such as toner is supplied to the electrostatic latent image by a developing device, so that the electrostatic latent image is developed. The developed image is transferred to the transferring material, e.g., paper, which is fed from a paper feeding device, and the above toner is fixed by a fixing device, and is discharged.
IMAGE FORMING APPARATUS

BACKGROUND OF THE INVENTION

1. Field of the Invention

The present invention relates to an image forming apparatus for forming an image corresponding to a font in accordance with font data, and more particularly to an image forming apparatus, which can form an image corresponding to a font in according with font data stored in the apparatus or font data stored in a storing apparatus to be mounted from an outer unit.

2. Description of the Related Art

A laser beam printer has been known as an image forming apparatus forming an image on a recording paper in accordance with image data supplied from an outer unit, for example, a host apparatus. In this apparatus, code data or image data is supplied to the laser beam printer from an outer host apparatus such as an electric filing apparatus, a word processor, a personal computer, and the like, a laser beam is modulated, scanned, and irradiated on an electric conductive member, that is, a photosensitive member, so that image data is developed after an electrostatic developing process, and image is transferred to a transferring material, for example, paper. That is, according to this type of image forming apparatus, image data supplied from the outer unit, that is, image data is expanded to bit map data, and the laser beam is modulated by bit map data. An electrostatic distribution pattern, that is, an electrostatic latent image, is formed on the photosensitive member where the modulated laser beam is scanned. Developer such as toner is supplied to the electrostatic latent image by a developing device, so that the electrostatic latent image is developed. The developed image is transferred to the transferring material, e.g., paper, which is fed from a paper feeding device, and the above toner is fixed by a fixing device, and is discharged.

According to the above type of the image forming apparatus, standard font data, e.g., curie or bold character data is stored in to a ROM (Read Only Memory) serving as a storing apparatus in the image forming apparatus, and code data serving as image data sent from the outer host apparatus is referred by font data and expanded to bit map data by a CPU (Central Processing Unit) provided in the image forming apparatus. In a case that font data is supplied to not only ROM but also the outer unit together with image data, data is also stored to a RAM (Random Access Memory) and can be referred. However, there is a problem of memory capacity, and it is not preferable that font data is stored in the RAM.

Recently, there has been prepared an outer storing apparatus having font data of an IC card or a font cartridge. The storing apparatus is mounted on the image forming apparatus as required and font data serving as the stored content is referred as required. If the outer storing apparatus is mounted on the image forming apparatus, a font name of font data stored in the storing apparatus and that of font data stored in the outer storing apparatus are normally displayed in a font menu of a control panel. An operator operates the control panel and selects a necessary font name, thereby image data is expanded to bit map data in accordance with the selected font data and an image is formed.

According to the conventional image forming apparatus, if the outer storing apparatus is mounted on the image forming apparatus, the font name of font data as the stored content is displayed in the menu. However, this only increases the number of selections in the menu, and there is a problem in that it is unclear which font name corresponds to the outer storing apparatus. Normally, a list of the font names of font data stored in the inner storing apparatus is displayed in the font menu of the control panel, and the font name of font data of the outer storing apparatus is displayed in addition to the font name of font data of the inner storing apparatus. Therefore, in view of the relation of the size of the display area, there is a problem in that the font name of font data stored in the outer storing apparatus is unclear unless the font name is retrieved. Or, there is a problem in that it is unclear whether or not the outer storing apparatus itself is mounted and the font name is displayed.

SUMMARY OF THE INVENTION

An object of the present invention is to provide image forming apparatus which can select a font name of font data of an outer storing apparatus prior to the other font name, and display the font name.

According to the present invention, there is provided an image forming apparatus comprising first storing means for storing first font data, second storing means, detachably provided in the apparatus, for storing second font data, converting means for converting font data to bit data and detecting the mount of the second storing means, image forming means for forming an image corresponding to font data in accordance with converted bit data, and display designating means for displaying a font name of convertible font data and designating the font name such that a font name of second font data is displayed prior to a font name of first font data in response to the mount detection of second storing means by converting means.

According to the image forming apparatus of the present invention, if the the outer storing apparatus in which font data is stored is mounted on the image forming apparatus, the mount of the outer storing apparatus is detected, the font name of font data of the outer storing apparatus is displayed prior to that of font data of the inner storing apparatus based on the detection of the mount. Since the font name other than the font name of font data of the standard inner storing apparatus is displayed, it is evidently shown that the outer storing is mounted. Moreover, since the font name of font data of the outer storing apparatus whose frequency of use is relatively high is displayed prior to the other font name, the operability of the image forming apparatus can be improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

An image forming apparatus relating to an embodiment of the present invention will be described with reference to the drawings.

Figure 1:
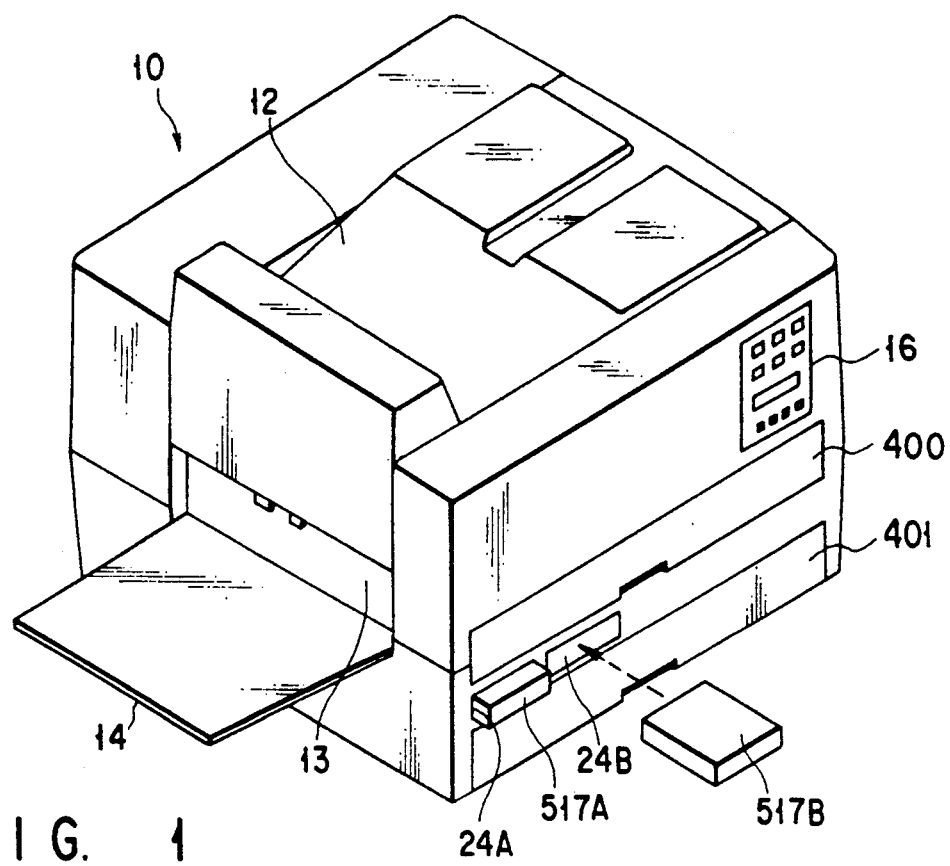
FIG. 1 is a perspective view showing the outline of an image forming apparatus according to the first embodiment of the present invention.
Figure 2:
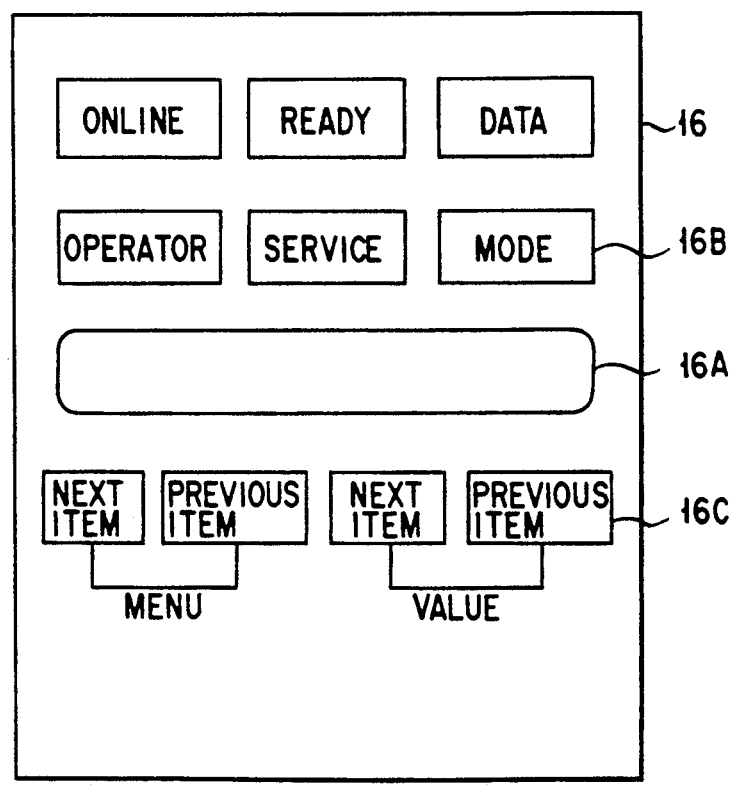
FIG. 2 is a plane view showing a control panel of the image forming apparatus of FIG. 1.
Figure 3:
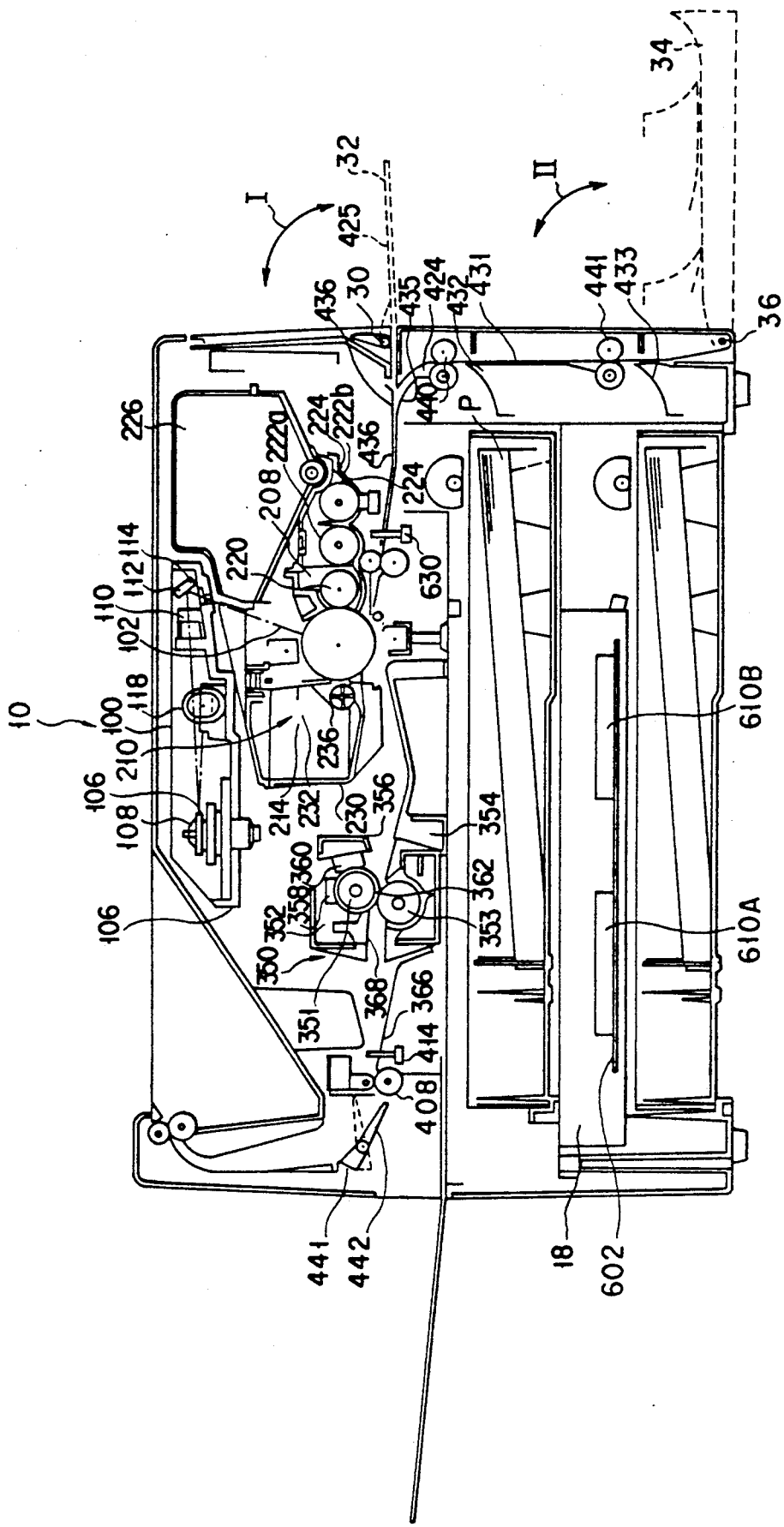
FIG. 3 is a cross sectional view of the image forming apparatus of FIG. 1.
Figure 4:
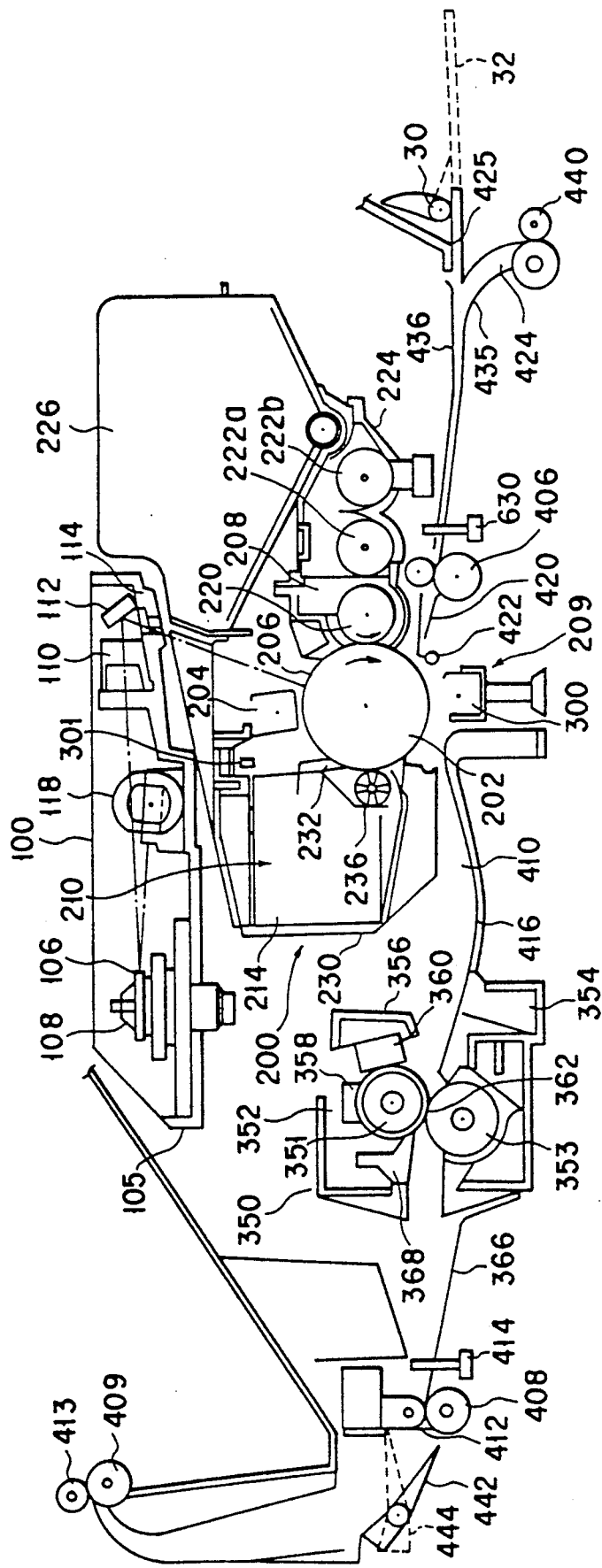
FIG. 4 is a cross sectional view showing an enlarged part of the imaging forming apparatus of FIG. 3.

FIG. 1 is a perspective view of a laser printer as an image forming apparatus, FIG. 2 shows a control section shown in FIG. 1, FIG. 3 is a cross sectional view showing the inner structure of the laser printer, and FIG. 4 is an enlarged view of FIG. 3.

As shown in FIG. 1, in a laser printer 10 as an image forming apparatus, an upper surface portion of a cylindrical member is formed to be inclined, and a concave portion 12, serving as a first paper delivery section, is formed thereon. A concave portion 13, serving as a second paper delivery section, is formed on a left side surface portion of the cylindrical member. A paper delivery tray 14 is attached to the concave portion 13 to be detachable from the cylindrical member. As shown in FIG. 3, a manual guide 32 is attached to a right side surface portion of the cylindrical member to be rotatable at a fulcrum 30, which is formed in the cylindrical member, in a direction of an arrow I of FIG. 3. A side surface cover 34 is attached to a lower portion of the manual guide 32 to be rotatable at a fulcrum 36, which is formed in the cylindrical member, in a direction of an arrow II of FIG. 3. As shown in FIG. 1, a control pane 16 is formed on a right side of a front surface of the cylindrical member, and paper cassettes 400 and 401 are mounted on a portion lower than the control panel 16 to be detachable from the apparatus. Moreover, there are formed openings 24A and 24B between the paper cassettes 400 and 401. The openings 24A and 24B are formed such that a font cart in which outer font data is stored and a card for an application soft are inserted thereto.

As shown in FIG. 2, the control panel 16 comprises a liquid crystal display 16A for displaying a number of paper, a mode guide message, and the like, an LED display 16B, which is lightened and displayed by various types of LEDs, and a switch 16C for displaying various types of operations. More specifically, the LED display 16B is formed of an "ONLINE" display showing whether or not the apparatus 10 is connected to the outer unit, that is, online/offline mode, a "READY" display showing that the apparatus 10 is in an operatable state, a "SERVICE" display requiring an operator call, and a "MODE" display showing an auto/manual mode. The switch 16C is formed of, for example, a menu key, a value key, or a ten key (not shown). The menu key is formed of two keys, that is, "next item" and "previous item" keys. The next item of a plurality of menu data, which is displayed on a left half of the liquid crystal display 16A, is displayed every time the "next item" key is depressed, and the previous item is displayed every time the "previous item" key is depressed. These display operations are performed to be circularly repeated. The value key is also formed of two keys, that is, "next item" and "previous item" keys. The display of the next item of a plurality of value data corresponding to menu data, which is displayed on a left half of the liquid crystal display 16A, is renewed every time the "next item" key is depressed, and the display of the previous item is returned every time the "previous item" key is depressed. These display operations are also performed to be circularly repeated. As explained in detail later, if "font" is displayed on the left half of the liquid crystal display 16A, the font name of font data stored in one of IC cards 517A and 517B, serving as an outer storing apparatus, is displayed on the right half of the liquid crystal display 16A in a case that an IC card, serving as the outer storing apparatus, or font cartridges 517A and 517B are mounted. In this case, if "next item" is depressed by the value key, the font name of font data stored in the other IC card 517A or IC card 517B, serving as an outer storing apparatus, is displayed on the light half of the liquid crystal display 16A. Moreover, if "next item" is depressed by the value key, the font name of inner font data stored in ROM, serving as an inner storing apparatus, is displayed on the right half of the liquid crystal display 16A. For inverting the display image, an "image reversed print" is selected by the menu key of the control panel 16, so that a reversed image is displayed. An operator selects a desired operation by operating the menu key or the value key, and can send an instruction to the apparatus.

As shown in FIGS. 3 and 4, a drum shape photosensitive member 202, serving as an image carrier member, is provided in the apparatus 10. The following apparatuses are sequentially arranged around the photosensitive member 202. That is, a charging apparatus 204 for charging the photosensitive member 202, which is formed of scorotoron, along a rotating direction shown by an arrow, an exposure portion 206 as means for forming an electrostatic latent image on the photosensitive member, a developing apparatus 208 for developing the electrostatic latent image with developer, a drum cleaner 210 for cleaning the photosensitive member 202, and a pre-exposing apparatus 301 for preliminarily exposing the photosensitive member 202 before exposing the image so as to stabilize the charging characteristic of the photosensitive member 202 are sequentially arranged around the photosensitive member 202. The photosensitive member 202, the charging apparatus 204, the developing apparatus 208, the drum cleaner 210, and the pre-exposing apparatus 301 are formed as one unit. That is, as shown in FIG. 4, these apparatuses are arranged as an electrophotography process unit 200, which is detachable from the apparatus.

As shown in FIG. 4, in a laser exposing unit 100, a laser diode (not shown) is formed in a case 105. A laser beam 102 emitted from the laser diode is converged by a condenser lens (not shown), and is made incident on a polarizing apparatus 108. A polyhedral mirror 106, which rotates at high speed is mounted on the polarizing apparatus 108. The laser beam 102 reflected on the polyhedral mirror 106 converges on the exposing portion 206 of the photosensitive member 202 through an F θH lens 110, a reflecting mirror 112, and a dust proof 114, the exposing portion 206 is scanned by the laser beam.

The developing apparatus 208 comprises a magnet roller 220 in a case 224, stirring rollers 222A, 222B, and developer (not shown), which is formed of two components, that is, carrier and toner. An electrostatic latent image is developed by toner. Moreover, a toner supplying apparatus 226 for supplying toner is attached to the developing apparatus 208.

An elastic blade 232 contacting the photosensitive member 202 is provided in a case 230 of the drum cleaner 210, so that toner left on the photosensitive member 202 is scraped away. The scraped toner is sent to a toner container 214 of the case by a transfer roller 236.

A fixing apparatus 350 comprises a heat roller 352 having a heat lamp 351 inside, and a pressing roller 353, which is pressurized by the heat roller 352. Paper P is passed between these rollers 352 and 353, so that an toner image is melted and fixed on paper P. The heat roller 352 and pressing roller 353 are surrounded by a lower casing 354 and an upper casing 356. Also, these rollers are structured so as to prevent heat from being moved to the outside in order to reserve a suitable temperature atmosphere, which is necessary for a suitable fixing. The heat roller 352 comes in contact with a cleaner 358, and is set to be in a cleaning state that the suitable fixing is always performed. Also, the surface temperature of the heat roller 352 is detected by a thermistor (not shown) to maintain temperature, which is necessary for the suitable fixing.

A guide 368 for separating paper is provided in the vicinity of the lower stream side of a contacting portion 362 between the heat roller 352 and the pressure roller 353 in the upper casing 356. The top end of paper P guided by the fixing apparatus 350 is surely separated from the heat roller 352. A paper guide 366 is provided at a paper outlet side of the fixing apparatus 350, and a fixed paper P is guided to a pair of first paper delivery rollers 408.

In the apparatus 10, an image transfer section 209 is provided between the photosensitive member 202 and a transferring apparatus 300. A transferring guide roller 422, a pair of paper guides 420, and a pair of aligning rollers 406 are provided at the upper stream side of the image transfer portion 209.

A paper transfer guide 416, the fixing apparatus 350, the pair of first paper delivery rollers 408, and a pair of second paper delivery rollers 409 are provided are provided at the lower stream stream side of the image transfer portion 209. Delectrifying brushes 412 and 413, which comes in contact with a non-image forming surface side of paper P along the transferring direction of paper P, in these paper delivery rollers.

In the lower portion of the apparatus 10, paper feeding rollers 402, 403, and paper cassettes 400 and 401 are arranged. In the vicinity of the paper feeding rollers 402 and 403, there is provided a paper empty switch (not shown) for detecting paper P in the paper cassettes 400 and 401. On the side surfaces of cases 450 and 470 of paper switches 400 and 401, there is provided a paper size detection switch (not shown) for detecting a paper size of contained paper P. Moreover, there is provided a paper cassette mount detection switch (not shown) for detecting that paper cassettes 400 and 401 are mounted on the apparatus 10.

At the lower stream side of the pair of the first paper delivery rollers 408, there is provided a gate apparatus 442 for changing a delivery path of paper P to the first paper delivery section or the second paper delivery section. As shown in the figure, two positions, that is, solid side line and broken line side, can be selected, and paper P is delivered to the first or second paper delivery section.

A paper delivery path 424 is provided at the right side of the paper cassettes 400 and 401. The paper delivery path 424 comprises paper guides 431, 432, 433, and a pair of paper delivery rollers 440 and 441. The side surface cover 34 is integrated into the paper guide 431. At the upper stream side of the pair of the paper delivery rollers 440, there are provided paper guides 435 and 436 for guiding paper P to the pair of aligning rollers 406. Also, at the upper portion of the paper delivery path 424, there is provided a paper delivery path 425 for manually delivering paper. The paper deliver path 425 is joined to the paper delivery path 424.

An aligning switch 630 is provided in the vicinity of the pair of aligning rollers 406. Also, a paper delivery switch 414 is provided in the vicinity of the pair of the first paper delivery rollers 408, and paper P moving in the apparatus 10 is detected.

On the back surface of the apparatus 10, an engine control board (not shown) and a power supply source (not shown) are arranged. On the engine control board, there is mounted an engine controlling circuit, which controls each electrical apparatus provided in the apparatus 10 and which controls an operation for completing the electrophotography process.

A printer control board 602 is arranged in a board containing section provided between the paper cassettes 400 and 401. On the printer control board 602, the printer controller for controlling the operation of the engine controller is mounted. The number of printer control boards 602, two printer control boards 602 at the maximum can be mounted in accordance with the extent of the additional functions, for example, additions of types of emulations. Moreover, font IC cards 571A 517B serving as the outer storing apparatus shown in FIG. 1, can be inserted to font card connectors 610A and 610B, which are arranged at two portions of the side edge portion of the printer board 600, thereby functions can be further added.

In the image forming operation, if the drum-like photosensitive member 202 is rotated, the surface potential of the photosensitive member 202 is maintained constant by the pre-exposing apparatus 301, and the photosensitive member 200 is uniformly charged by the charging apparatus 204. The laser beam 102 emitted from the laser exposing unit 100 is modulated in accordance with an image signal, that is, image data. The photosensitive member 202 is scanned and exposed with The modulated laser beam 102, and an electrostatic latent image corresponding to the image signal is formed. The electrostatic latent image on the photosensitive member 202 is developed by the developing apparatus 208, and image-formed as a toner image, and sent to the image transfer section 209.

On the other hand, paper P taken out of the paper cassette 400 or 401 is sent to the paper guide 432 or 433 synchronously with the toner image forming operation. Then, paper P is passed through the paper delivery path 424, and sent to the image transfer section 209 through the pair of aligning rollers 406, transferring guide roller 422, and pair of paper guides 420, and the toner image formed on the photosensitive member 202 is transferred to paper P by the transferring apparatus 300. Then, paper P is guided by the paper transfer guide 416, passed through the paper delivery path 410, sent to the fixing apparatus 350, and the toner image is melted and fixed to paper P. Paper P delivered from the manual guide 32 is passed through the manual paper delivery path 425, and guided to the paper delivery path 424, and the same operation as motioned above is carried out.

Paper P passed through the fixing apparatus 350 is sent to the pair of the paper delivery rollers 408, and sent to the gate apparatus 442. The position of the gate is selected by the instruction sent from the host apparatus in advance. In a case that the first position is selected, paper P is sent to the first paper delivery section, and discharged on the upper surface cover through the second pair of paper delivery rollers 409. In a case that the second position is selected, paper P is sent to the second paper delivery section, and discharged onto the paper delivery tray 14.

After transferring the toner image on paper P, the residual toner left on the photosensitive member 202 is mechanically scraped away the photosensitive member 202 by the drum cleaner 210, which is formed of an elastic member 212, and collected to a toner collecting section 34 in the apparatus.

The details of the printer control board 602 will be explained with reference to FIG. 5 as follows.

Figure 5:
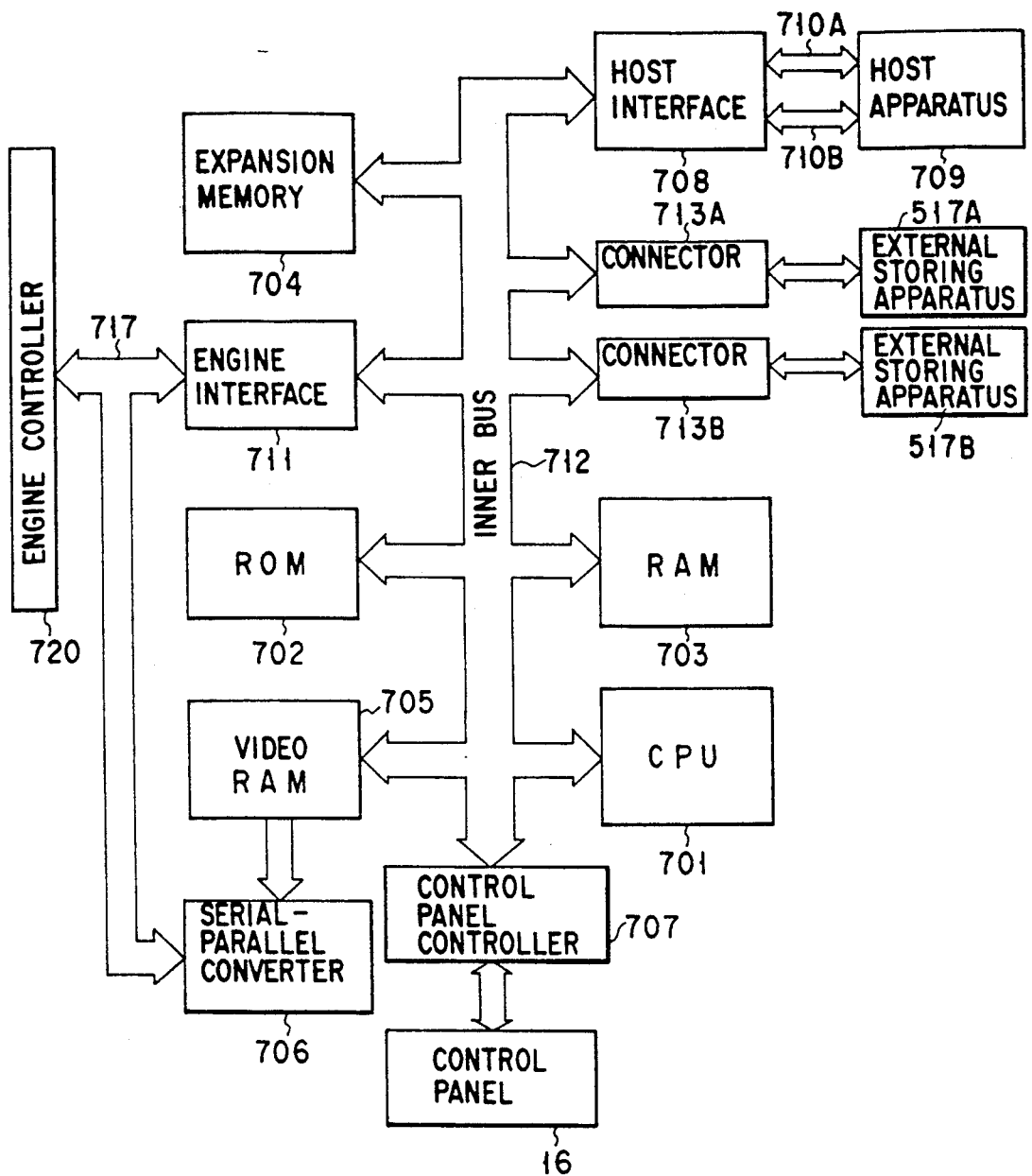
FIG. 5 is a block diagram showing the outline of a printer control board circuit of the image forming apparatus of the present invention.

In the printer control board 602 of FIG. 5, CPU 701 is connected to an inner bus 712, and controls the whole printer control board 602 through the inner bus 712. In other words, a control program, which CPU 701 executes, is stored in a ROM 702 connected to the inner bus 712. CPU 701 executes the control operation in accordance with the program. In ROM 702, a password, which is checked when data is changed, data on paper such a top margin, a left margin, a paper type, and the like other than the control program are stored. Similarly, a RAM 703 connected to the inner bus 712 is used as a page buffer. In RAM 703, code data, which is sent from a host apparatus 709 through a host interface 708 and the inner bus 712, image data including bit image data, font data, and micro data managing font data are temporarily stored. Image data such as font data other than bit image data is expanded to bit image data in accordance with micro data and a control parameter stored in ROM 702 by CPU 701, and is temporarily stored in RAM 703.

An expansion memory 704 is provided in the inner bus 712. The expansion memory 704 is used as a memory having a large capacity in a case that image data sent from the host apparatus 709 is the large amount of data such as bit map data and data for one page cannot be stored in RAM 703. Moreover, CPU 701 expands bit image data stored in RAM 703 to image data by the control parameter outputted from ROM 702. In this case, a video RAM 705 for storing image data is connected to the inner bus 712. Parallel data of bit image sent from the video RAM 705 is supplied to a serial-parallel converter 706, and converted to serial data. Serial data is sent to an engine controller 720. A drive signal is generated from the engine controller 720 in accordance with serial data, and the drive signal is synchronized with a synchronous signal, and sent to the engine. As a result, as explained above, the polyhedral mirror 106 is controlled in respond to the drive signal, and the output sent from the semiconductor laser of the laser exposing unit 100 is modulated, and an electrostatic latent image is formed on the photosensitive member 202.

The host interface 708 is provided so as to receive and transmit data between the host apparatus 709, which is formed of an computer or an image reading apparatus, and the printer control board 602. The host interface 708 has two types of transfer lines, that is, a serial transfer line 710A for transferring serial data and parallel transfer line 710B for transferring parallel data. The serial and parallel transfer lines 710A and 710B can be suitably selected in accordance with the type of data to be transferred between the host interface 708 and the host apparatus.

An engine interface 711 is used to receive and transmit an interface signal 717 between the printer controller and the engine controller. Connectors 713A and 713B, which are connected to the inner bus 712, are provided to supply power or a signal to connectors 610A and 610B of the outer storing apparatus such as cartridge fonts or IC cards 517A and 517B, and to prevent noise from being generated when the outer storing apparatus is detached. A control panel controller 707 is provided to control the display of the guide message on the liquid crystal display 16A of the control panel 16, to control of turning on/off or flickering the LED display 16B or flickering, or to control control of sending data inputted from the switch 16C to CPU 701. The IC cards 517A and 517B as an outer storing apparatus comprise a nonvolatile memory such as static RAM with battery backup, EEPROM, EPROM, or mask ROM. As explained above, font data, the emulation program, and the like are stored in these IC cards.

The CPU 701 periodically monitors connectors 713A and 713B through the inner bus 712. Moreover, the CPU 701 monitors whether or not the outer storing apparatus 517A or 517B is connected to the connectors 713A and 713B. The monitor program is stored in the ROM 702 in advance. In other words, if "font" is displayed on the liquid crystal display 16A of the control panel 16, a font display signal is sent to the CPU 701 from the panel controller 707, and the CPU 701 executes the monitor program stored in the ROM 702 in response to the font display signal. In inquiry, it is asked whether or not the CPU 701 is connected to the connectors 713A and 713B and whether or not the outer storing apparatus 517A or 517B is connected to the connectors 713A and 713B. In a case that the outer storing apparatus 517A or 517B is not connected to the connectors 713A and 713B, the CPU 701 sends a control command to the control panel controller 707 so as to display the font name of font data stored in the ROM 702 on the liquid crystal display 16A of the control panel 16. As a result, the font name of font data is displayed on the liquid crystal display 16A. In a case that the outer storing apparatus 517A or 517B is connected to the connectors 713A and 713B, the CPU 701 recognizes the font name of font data stored in the outer storing apparatus 517A or 517B in response to a signal to be transmitted from the outer storing apparatus 517A or 517B through the connectors 713A and 713B. Then, the CPU 701 sends a control command to the control panel controller 707 so as to display the font name of font data on the liquid crystal display 16A of the control panel 16. As a result, the font name of font data stored in the outer storing apparatus 517A or 517B is displayed on the liquid crystal display 16A of the control panel 16. of the control panel 16 prior to the other font name.

Figure 6:
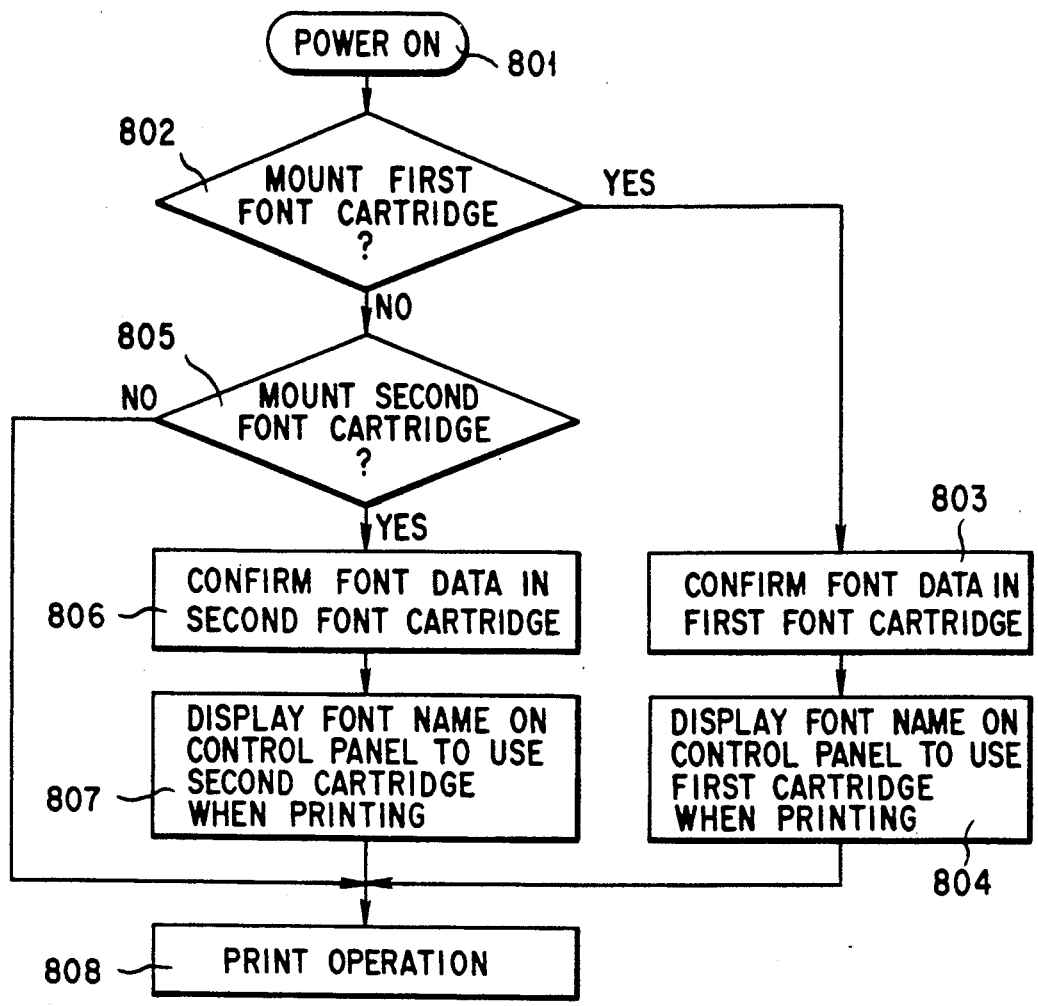
FIG. 6 shows a flow chart relating to a font display of the circuit of FIG. 5.

The following will explain the operations, which is from the power-on operation to the printing operation, with reference to FIG. 6.

As shown in step 801, the power of the apparatus is turned on, the CPU 701 confirms whether or not the first outer storing apparatus, that is, the font cartridge 517A is connected to the connectors 713A through the inner bus 712 as shown in step 802. In step 802, if it is confirmed that the font cartridge 517A is connected to the connectors 713A, font data stored in the font cartridge 517A is confirmed as shown in step 803. As shown in step 804, if font data is confirmed, data is transferred to the scanning panel 16, and the font name, which was already displayed on the liquid crystal display 16A, is changed to the font name stored in the font cartridge 517A. In a case that the first outer storing apparatus 517A is not connected to the connectors 713A, the CPU 701 confirms whether or not the second outer storing apparatus, that is, font cartridge 517B is connected to the connectors 713B through the inner bus 712 as shown in step 805. In step 805, if it is confirmed that the font cartridge 517B is connected to the connectors 713B, font data stored in the font cartridge 517B is confirmed as shown in step 806. If font data is confirmed as shown step 807, data is transferred to the scanning panel 16, and the font name, which was already displayed on the liquid crystal display 16A, is changed to the font name stored in the font cartridge 517A. As already explained, if the first and second outer storing apparatuses 517A and 517B are not connected to the connectors 713A and 713B, the CPU 701 sends the control command to the control panel controller 707 so as to display the font name of font data stored in ROM 702 on the liquid crystal display 16A of the control panel 16. As a result, the font name of font data is displayed on the liquid crystal display 16A of the control panel 16. If the font is selected from the font name of font data, a printing operation is executed as shown in step 808. It is noted that the CPU 701 monitors whether or not an output sent from the connectors 713A and 713B, serving as I/0 ports, that is, an output level of the detection signal is in a low level L.

More specifically, the following font name can be displayed.

Figure 7A:
FIGS. 7A and 7B are views showing the display of the font names of the display section of the control panel of FIG. 2.
Figure 7B:

In a case that the outer storing apparatuses 517A and 517B are inserted to at least one of openings 24A and 24B, the font name of font data stored in the outer storing apparatuses 517A and 517B is displayed prior to the other name as shown in FIG. 7A. In a case that the outer storing apparatuses 517A and 517B are not inserted to the openings 24A and 24B, the font name of font data stored in the ROM 702 is displayed as shown in FIG. 6(B). In FIG. 7A, at least one of the outer storing apparatuses 517A and 517B is connected, an outer font "CARTRIDGE" or a specific font name "TIME" is displayed prior to the other name. Then, in the case that this outer font is used, the image forming is executed by the selection of this outer font. However, in the case that this outer font is not used, a font name "ITALIC" of font data stored in the ROM 702 is displayed as shown in FIG. 7B. In contrast, if the outer storing apparatuses 517A and 517B are not connected, "ITALIC" is normally selected from ITALIC, BOLD, CURIE, which are the names of the built-in fonts, and displayed as shown in FIG. 7A and FIG. 6(B). Thereafter, if the screen of the liquid crystal display 16A is scrolled, the built-in fonts such as "BOLD" and "CU-RIE" are displayed. A suitable font is selected from these built-in fonts and used.

According to the font display of the above liquid crystal display 16A, the operator can recognize the state that the outer storing apparatuses 517A and 517B having the outer fonts are mounted on the opening 24A and 24B, and the mounting state can be positively used. The point that the the outer storing apparatuses 517A and 517B are mounted means that the rate of using the outer font is high, and the display of the above font can improve operability. In other words, if the outer font is used, the number of operations of the control panel can be reduced since the selection of the font can be rapidly and easily made.

In the above embodiment, the state that the outer storing apparatuses 517A and 517B are mounted on the opening 24A and 24B was detected and transmitted from the view point of the software. However, the present invention is not limited to the above embodiment. The detection may be carried out in a state that the outer storing apparatuses 517A and 517B are electrically connected to the connector. Moreover, it is of course that there may be newly provided a switch for turning on/off depending on whether or not the the outer storing apparatuses 517A and 517B are mounted on the opening 24A and 24B.

According to the image forming apparatus of the present invention, since the outer font is automatically displayed prior to the other fonts if the outer storing apparatuses having the outer font are connected, the selection of the font can be rapidly and easily made.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An image forming apparatus for forming a character image corresponding to character data on an image bearing member, comprising:

means for receiving character code data from a host apparatus, the character code data defining the characters to be formed on the image bearing member;

first storing means, fixedly mounted in the image forming apparatus, for storing first font data representing a first expanding pattern in which the character code data is expanded to the character data;

second storing means, detachably mounted in the image forming apparatus, for storing second font data representing a second expanding pattern in which the character code data is expanded to the character data;

means for detecting that the second storing means is mounted in the image forming apparatus;

first selecting means for automatically selecting the second font data based on the detection of the detecting means;

second selecting means for selecting one of the first font data and the second font data irrespective of the selection by the first selecting means, the second selecting means being manually operable;

means for displaying at least one of the first and second font names so as to point out the font data selected by the first selecting means and the second selecting means, the first font name being the name of the first font data and the second font name being the name of the second font data;

means for expanding the character code data into the character data using one of the first font data and the second font data, selected by the first electing means and the second selecting means; and means for forming an image corresponding to the character data on the image bearing member.

2. The apparatus according to claim 1 further comprising:

third means, detachably provided in said apparatus, for storing third font data, wherein said detecting means detects the amount of said third means on said apparatus, and said designating mans displays a font name of said third font data prior to the font name of said first font data prior to the font name of said first font date in response to said mount detection.

3. The apparatus according to claim 2, wherein said detecting means displays the font name of said second font data on said designating means prior to the font names of said first and third font data in response to the mount detection of said second and third storing means on said apparatus.

4. The apparatus according to claim 1, wherein said first storing means has an area for storing converted bit data.

5. The apparatus according to claim 1 further comprising:

mount means for mounting said second storing means, and generating a mount detection signal in accordance with the mount.

6. The apparatus according to claim 2, further comprising:

mount means for mounting said third storing means, and generating a mount detection signal in accordance with the mount.

* * * * *